Nov. 9, 1948.   A. J. BACHELDER ET AL   2,453,180
SHUTTER MECHANISM

Filed Nov. 9, 1945   3 Sheets-Sheet 1

INVENTORS
Albert J. Bachelder
BY Otto E. Wolff
Watson, Bristol, Johnson & Leavenworth
ATTORNEYS Nov. 9, 1948.  A. J. BACHELDER ET AL  2,453,180
SHUTTER MECHANISM
Filed Nov. 9, 1945  3 Sheets-Sheet 2

Nov. 9, 1948.　　A. J. BACHELDER ET AL　　2,453,180
SHUTTER MECHANISM

Filed Nov. 9, 1945　　3 Sheets-Sheet 3

INVENTORS
Albert J. Bachelder
BY Otto E. Wolff
Watson, Bristol, Johnson & Leavenworth
ATTORNEYS Patented Nov. 9, 1948

2,453,180

UNITED STATES PATENT OFFICE 2,453,180

SHUTTER MECHANISM

Albert J. Bachelder, Lexington, and Otto E. Wolff, Cambridge, Mass., assignors to Polaroid Corporation, Cambridge, Mass., a corporation of Delaware Application November 9, 1945, Serial No. 627,745

5 Claims. (Cl. 95—18)

1

The invention concerns camera shutter mechanism applicable as to certain features to cameras in general and having further features which are particularly directed to the operation of cameras having two exposure apertures, such as a stereoscopic camera.

In the more general aspects noted, the invention proposes an improved arrangement for controlling the operation of a camera, either for automatic instantaneous exposures or for time exposures, and for pre-setting the camera for the desired character of operation. For this purpose, the mechanism embodies a simple double latch means, one of which is effective to restrain the shutter operating mechanism in a cocked or energized position, adapted upon tripping thereof automatically to open and then close the shutter or shutters, the second latch being adapted, however, to be electively pre-set to a position whereby upon release of the first latch the operating mechanism engages with the second latch and is restrained thereby in the shutter open position for a time exposure until the mechanism is manually released from the second latch. The organization also incorporates means whereby the time interval of the so-called automatic instantaneous exposure may be adjusted within limits.

The mechanism embodies features rendering it of particular advantage in the simultaneous operation of spaced shutters for binocular instruments, particularly stereoscopic cameras. The complete arrangement includes in this respect a pivoted lever and associated means for rocking it, the lever having connections for operating both shutters in exact timed relation. The mechanism is well balanced and relatively free of inertia or friction and constitutes a simple, reliable means for operating the shutters simultaneously and without variation except in so far as the exposure interval is purposely adjusted, the mechanism being well adapted and fully responsive to such adjustments.

These and other objects will be made more apparent from the detail discussion, and the invention comprises the features of construction, combination of elements, and arrangement of parts which will be exemplified in the construction hereinafter set forth, and the scope of which invention will be indicated in the claims.

In the detailed description to follow, reference should be had to the accompanying drawings, in which:

Fig. 1 is a plan view of the stereoscopic camera, with the top of the casing broken away and the optical system removed;

2

Fig. 5 is a fragmentary view similar to Fig. 4, with the shutter mechanism in open cocked position for a time exposure;

Fig. 6 is a fragmentary view of the time delay mechanism; and,

Fig. 7 is a small detail fragmentary view showing the manually operated connections for releasing and operating the shutters.

Figure 1:
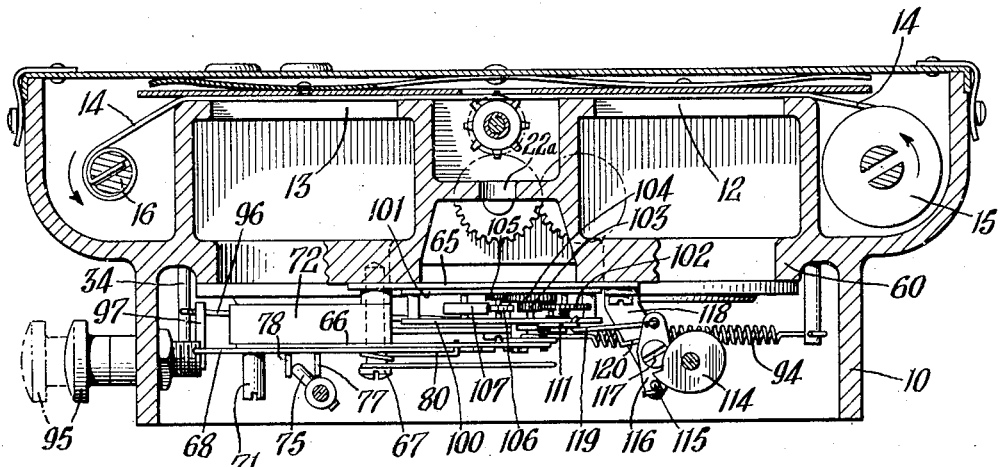
Figure 2:
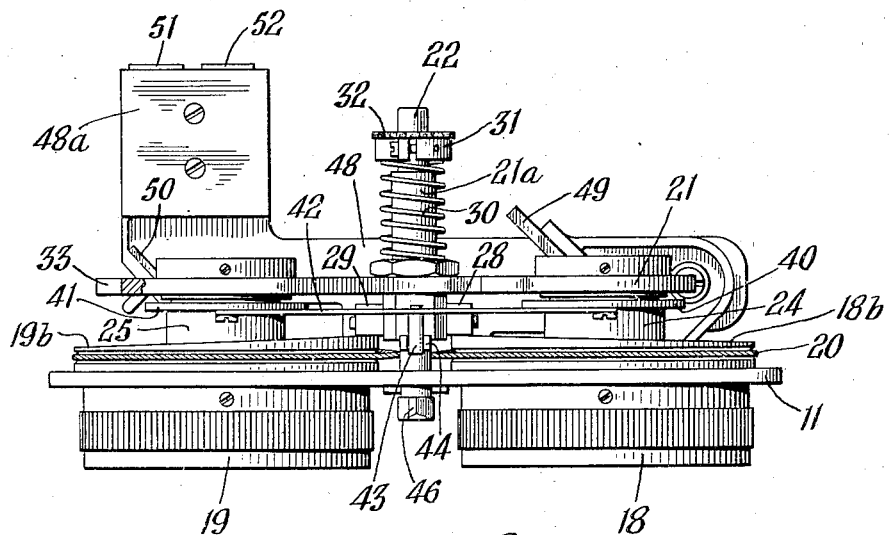
Fig. 2 is a plan view of the optical system adapted to be inserted in the casing of Fig. 1.

The general arrangement of a stereoscopic camera embodying the invention is shown in Fig. 1, taken together with Fig. 2. Fig. 1 shows the main casing 10, and Fig. 2, the front plate 11 therefor, to which are attached various parts constituting the optical system. A film chamber is shown at the rear of the main casing in Fig. 1, having the respective spaced openings 12 and 13 for simultaneously exposing spaced frame sections of the film 14 which is suspended between the two spools 15 and 16 in any suitable manner.

Figure 3:
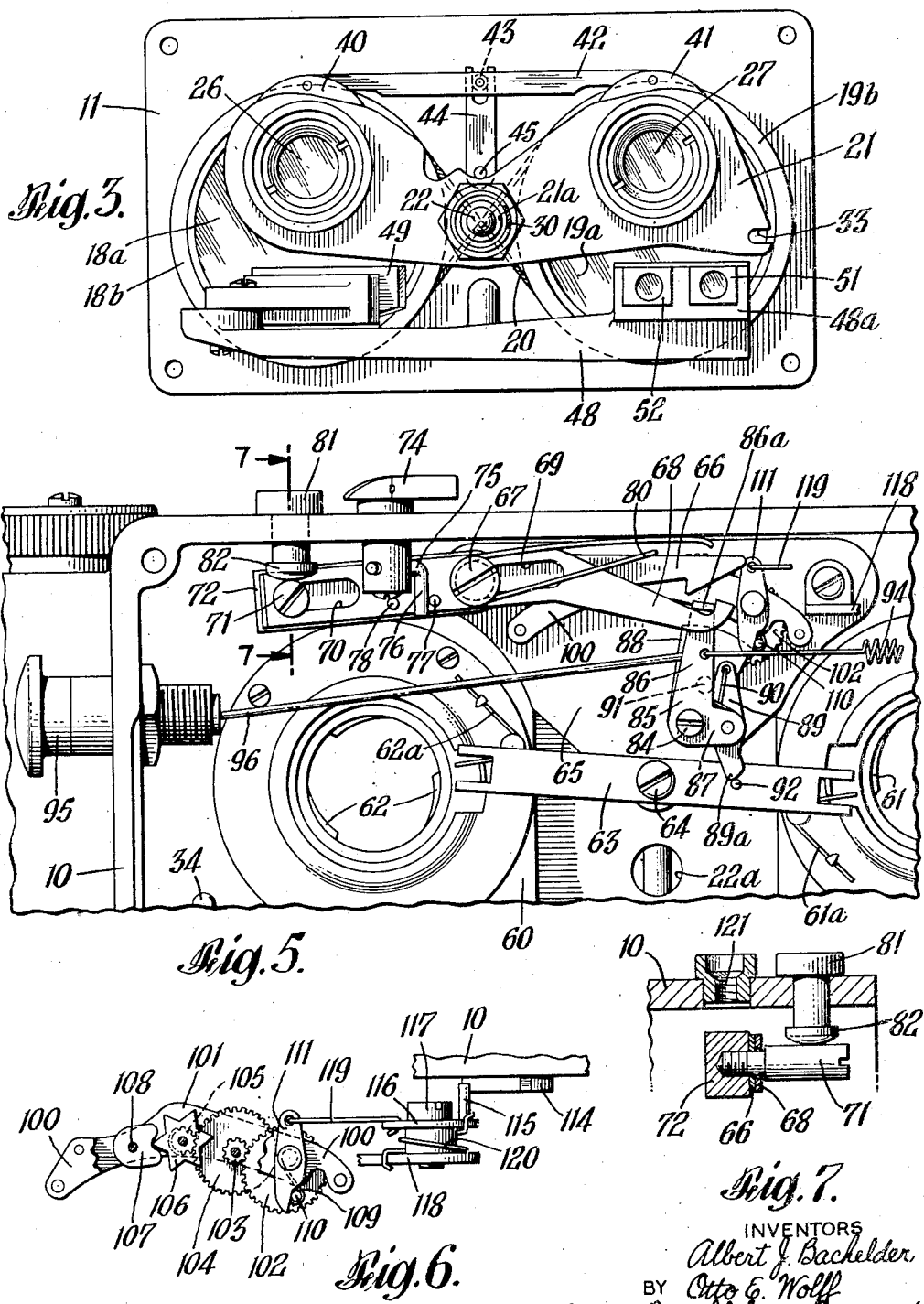
Fig. 3 is a rear view in elevation of the front cover, with the optical mechanism of Fig. 2 attached thereto.

The optical system may vary in construction and arrangement, the one selected for illustration herein forming the subject matter particularly claimed in the copending application of Edwin H. Land, Albert J. Bachelder and Otto E. Wolff, Serial No. 627,744, filed concurrently herewith. The general features include a ray converging system comprising a pair of rotatable mounts 18 and 19, carrying optical wedges or prisms symmetrically arranged in the respective mounts which in turn are symmetrically located in the front plate 11. The mounts 18 and 19 are adapted to be rotated simultaneously and in opposite directions through the medium of a cable connection 20 occupying grooves in portions of the mounts 18 and 19 extending rearwardly of the plate 11, the cable being crossed between the mounts, as shown particularly in Fig. 3. Located rearwardly of the converging mechanism is a lens board or frame 21, provided with a sleeve 21a which is slidably mounted on the post 22 secured at its forward end in the plate 11, and having a support at its rear end in an opening 22a of an intermediate casing part (see Fig. 1). The lens board 21 carries a pair of housings 24 and 25 containing matched objective lenses 26 and 27 symmetrically located with respect to the prisms 18a and 19a, as shown in Fig. 3, and having their axes parallel to each other and parallel to the axes of rotation of the two prism mounts. Focusing of the objective lenses is accomplished through adjustment of the lens board 21 on the post 22. This adjustment is effected simultaneously and in consonance with the adjustment of the convergence of the rotary prisms by means of annular cams 18b and 19b comprising flanges on the rear portions of the respective prism mounts 18 and 19. Fixedly secured with respect to the lens board 21 are a pair of spaced cam followers or fingers 28 and 29 adapted to bear against the rear edges of the arcuate cams 18b and 19b respectively. The elements 28 and 29 are maintained in contact with the cams through the compression spring 30 located between the lens board 21 and a ring 31 fixed adjacent the rear end of post 22. A felt washer 32 may be provided to insure against filtering of light around the post 22 into the film compartment. A notch 33 in the lens board 21 receives a pin 34 secured in the casing which restrains the lens board from rotation about the post 22.

As here shown, diaphragms for the lenses and the adjusting means therefor are directly associated with the lens barrels 24 and 25 and form a part of the unit shown in Fig. 2. Details of the lens diaphragms are omitted, since they form no part of the present invention, but, in general, they are shown as located intermediate components of the respective objective lens means and have operative elements 40 and 41 linked together by bar 42. At its central portion, bar 42 is provided with a pin 43 which is received by the notched end of an arm 44 secured on a shaft 45 which extends through the front plate 11 and is provided with an operating finger 46 which moves over a suitable scale on the front surface of the front plate.

The camera includes a range finder system which may vary in character and location, but, as here shown, is in general mounted on the front panel 11. For this purpose, the lower part of the panel 11 has secured thereon a bracket 48 which carries an inclined mirror 49 in association with the prism 18a and an inclined mirror 50 similarly associated with the prism 19a, the latter mirror being one-half the height of mirror 49. An eye-piece 51 is shown mounted in the extension 48a of bracket 48 in appropriate relation to the mirrors 50 and 49. It will be noted that adjustment of the object field, as determined in the range finder means through rotation of the prisms 18a and 19a, effects simultaneously a proper focusing of the lenses 26 and 27 and the field of convergence of images transmitted thereto by the prisms 18a and 19a. A suitable view finder 52 may also be associated with the range finder 51, as indicated generally in Figs. 2 and 3.

Figure 4:
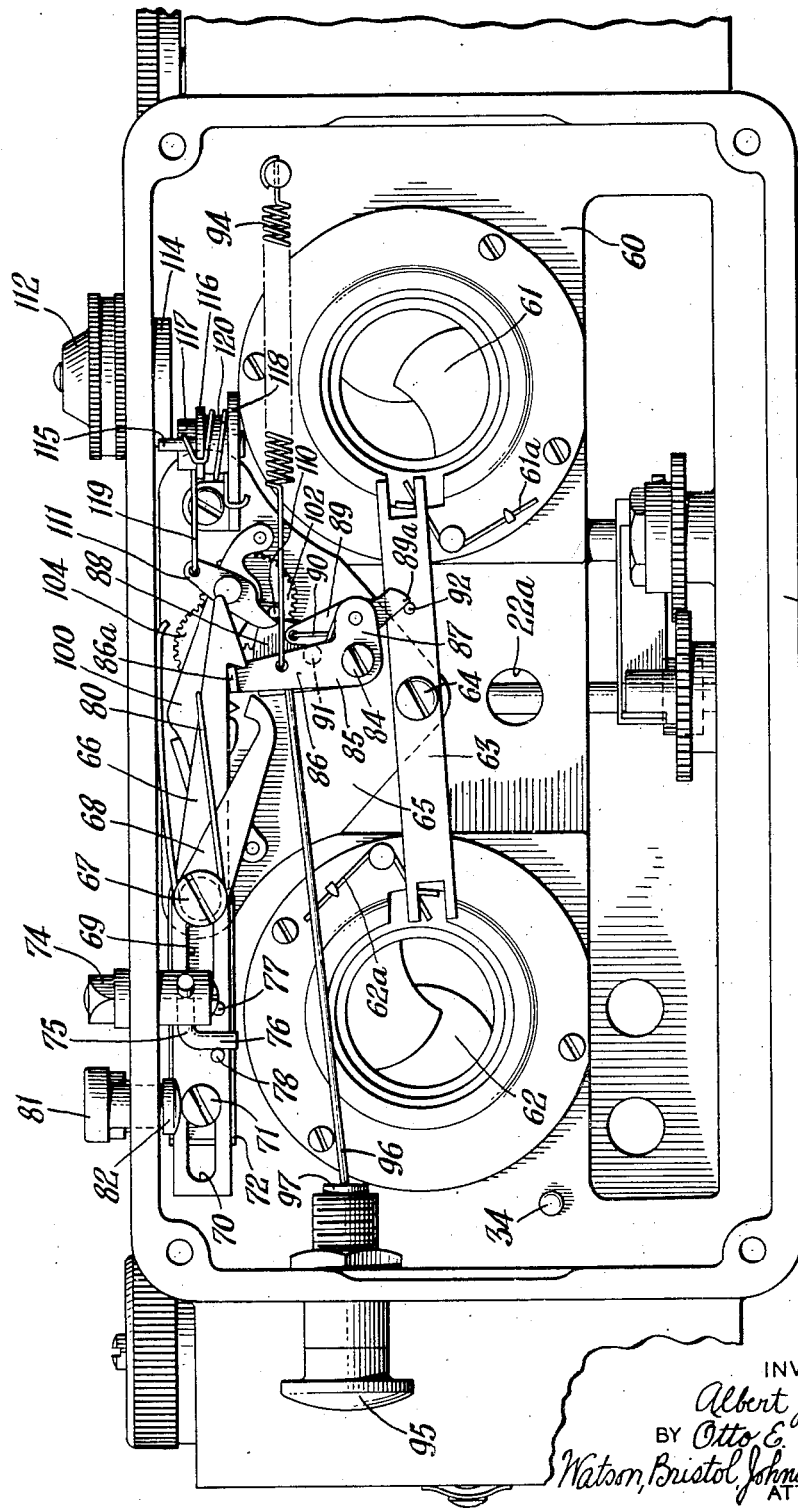
Fig. 4 is an enlarged view in elevation of the shutter mechanism looking into the camera from the front, with the optical assembly removed.

The shutters and operating mechanism therefor are mounted in the main casing 10 adjacent the front wall 60 of the film compartment. The general relation of the elements comprising the operating mechanism for the shutters is shown particularly in Fig. 4. The shutters 61 and 62, which may be of a conventional form, are secured to the front of the wall 60 of the film compartment and are linked together by a bar 63 pivoted at 64 on a bracket 65 which in turn is secured to the wall 60 of the casing. The shutters are urged to the normally closed position by suitable means such as the springs 61a and 62a. Also secured on the bracket 65 is a latch lever 66 pivoted at its midpoint on a pin 67. Mounted adjacent and forwardly of the lever 66, in Fig. 4, is a supplemental latch lever 68 slidably mounted with respect to the lever 66 through the medium of slots 69 and 70 in the lever 68, the slot 69 engaging around the pivot pin 67 and the slot 70 receiving the pin 71 fixed in a block 72 which is secured to the lever 66 and is likewise pivoted on pin 67. The slidable lever 68 forms part of the control mechanism in conjunction with the operation of the camera for time exposures, as will be described more in detail hereinafter. For the present, it is noted that longitudinal adjustment of the lever 68 with respect to lever 66 is effected by means of a manually operated finger-piece 74, shown above the casing in Fig. 4, secured to a shaft, the lower end of which has secured thereto an arm 75 with a right-angle portion 76 engaging between pins 77 and 78 fixed on slide bar 68. Rotation of the finger lever 74 adjusts slide bar 68 to the position shown in Fig. 5, a suitable scale being provided on the casing to indicate the adjustment.

A spring 80 engaging over lever 66 urges it in a clockwise direction to the latched position shown in Fig. 4. Mounted in the casing at the upper left-hand corner is a button 81 connected to a pin which carries at its lower end a contact button 82 which is adapted to engage the pin 71 secured on the lever 66. Depressing the button 81 rocks the lever 66 in a counter-clockwise direction against the force of spring 80. Pivotally mounted at 84 on the bracket 65 is a bellcrank 85 having an upstanding latch arm 86 and a horizontally extending arm 87. Spaced behind the arm 86, in Fig. 4, and rigidly associated therewith is a cam arm 88 adapted to rock with the bellcrank about the pivot 84. The arm 87 of the bellcrank has pivoted thereon a latch member 89, located in a plane between the cam lever 88 and arm 86 of the bellcrank and urged by spring 90 in a counter-clockwise direction, being limited in its movement in that direction by stop 91 located between the spaced arms 87 and 88. The lower end of the latch lever 89 is adapted to engage a pin 92 secured on the shutter lever 63. Bellcrank 85 is normally urged in a clockwise direction by the coil spring 94. Movement in the opposite direction for cocking of the shutter mechanism is effected by pulling the button 95 located on the left side of the casing which is connected through a stiff wire member 96 to the arm 86. Preferably the button 95 is spring urged to the right in accordance with well known means and is connected to the wire 96 through an offset arm 97 (see Fig. 1) which is free to slide to the right along the wire upon release of the button.

A resumé of the operation of the mechanism will be given below, but for the moment it is pointed out that the mechanism is shown in Fig. 4 in cocked position for an automatic instantaneous exposure, the interval of which is controlled by a time delay clock mechanism engaged by the cam arm 88. Such time delay mechanism may vary in construction, a suitable means for this purpose, which is illustrative only, being shown particularly in Fig. 6, with some further details appearing in Figs. 1 and 4. In general, the mechanism shown includes a train of gears mounted between the spaced plates 100 and 101. Shown farthest to the right is a gear 102 which meshes with a smaller gear 103 which has rotatable therewith a gear 104, the latter gear meshing with a pinion 105. Rotatable with pinion 105 is a star wheel 106 which engages with an escapement member 107 adapted to oscillate about a pin 108. A spring means of any suitable type, such as shown at 109, is adapted to operate on the gear train, urging gear 102 in a clockwise direction. Gear 102 carries a pin 110 which, as shown in Fig. 4, is adapted to be engaged by cam arm 88 when the latter moves to the right. The initial position of pin 110 is determined by the lower end of lever 111 pivoted on the forward face of the plate 100. The position of lever 111 is adjustable by means of a rotatable button 112 mounted above the casing at the right, which has a suitable scale adapted to indicate the automatic exposure interval. The button 112 is secured to a shaft which projects through the casing into the interior and carries on its lower end a cam 114 adapted to engage at its periphery an upstanding pin 115 secured on a lever 116, the lever being pivoted at 117 on a bracket 118 secured to the wall 60 of the casing. The opposite end of lever 116 has a rigid wire connection 119 to the adjustable lever 111. The lever 116 is normally urged in a counter-clockwise direction (see Fig. 1), as limited by the engagement of pin 115 against the edge of cam 114, by a wire spring 120. It will be seen that the initial position of gear 102 and consequently of the pin 110 thereon is determined by the position of the lever 111, which in turn is determined by the position of the button 112.

The operation of the shutter mechanism will now be described, first as an instantaneous or automatic time interval exposure. For this purpose, the slide bar 68 is adjusted by the finger lever 74 to the left and occupies the position shown generally in Fig. 4. To cock the shutter mechanism, wire rod 96 is pulled left by button 95 which rocks the bellcrank 85 and the cam arm 88 counter-clockwise. Because of its pivotal support on the arm 87, the lower end of latch lever 89 passes by pin 92 on bar 63. The right-angle lug 86a on arm 86 is latched under trip lever 66. Also, as shown in Fig. 4, as the cam arm 88 rocks to the left, it releases pin 110 on gear 102, permitting the latter to rotate clockwise until it engages the stop arm 111. The mechanism is now energized for automatic opening and closing of the shutters for exposure. Depressing button 81 disengages latch 66 from lug 86a, which permits bellcrank 85 and cam arm 88 to move clockwise. In so doing, the lower end of latch lever 89 engages pin 92, causing it to rock lever 63 clockwise, which opens the shutters and as the point 89a passes the pin 92, the bar 63 returns to the position shown in Fig. 4 under the action of the normal spring means embodied in the shutters, and the shutters quickly close. The time interval in shutter closing is governed by the position of pin 110. The farther to the left that pin 110 is positioned when the shutters are in cocked condition the sooner it is engaged by cam arm 88 and the farther the cam must push pin 110 which is slowed up in its movement by the time delay mechanism connected to the gear 102 on which pin 110 is mounted. This mechanism as illustrated and as described previously herein comprises the gear train 102, 103, 104 and 105, the gear 105 having rotatable therewith the star wheel 106 which engages the oscillatable escapement member 108 operating and functioning in the usual manner.

For a time exposure the slide 68 will be set in its extreme position to the right, as shown in Fig. 5. Assuming that the shutter mechanism is first cocked or energized as shown in Fig. 4, upon depressing button 81, the bellcrank 85 and cam arm 88 will move initially only to the position shown in Fig. 5, wherein lug 86a is engaged and restrained by the latch end of slide 68. In this movement the lower end of lever 89 will have engaged pin 92 rocking lever 63 to the position shown wherein the shutters are held open. Upon release of button 81 at the end of the desired exposure, spring 80 will rock bar 68 clockwise, releasing bellcrank 85, causing the lower end of lever 89 to move to the left, releasing pin 92 and shutter bar 63 and permitting the shutters to close.

The shutter mechanism has been described as controlled by button 81. It is also adapted, however, to be controlled in a similar manner by a bulb or cable attachment. As shown more clearly in Fig. 7, a screw socket 121 is provided in the casing for connecting the bulb tube or the cable with an opening for a pin to engage against the block 72 to rock the levers 66 and 68 in the same manner as with button 81.

Since certain changes may be made in the above construction and different embodiments of the invention could be made without departing from the scope thereof, it is intended that all matter contained in the above description or shown in the accompanying drawings shall be interpreted as illustrative and not in a limiting sense. As a particular example in this respect, reference in the specification and claims to a "time" exposure is intended to include any exposure which is not instantaneous, and specifically such exposures as are commonly designated "bulb" exposures.

Having described our invention, what we claim as new and desire to secure by Letters Patent is:

1. In a binocular camera, a pair of spaced shutters normally urged by elastic means to a closed position, a pivoted lever connected to said shutters and capable of rocking movement to open both said shutters simultaneously, actuator means movable in a predetermined path and adapted in said movement first to engage a part arranged to rock said lever and thereby open said shutters and then to release said part permitting said elastic means to close said shutters.

2. In a stereoscopic camera, a pair of spaced shutters of the iris diaphragm type normally urged to closed position and each having an oscillatable operating member, a lever pivoted intermediate said shutters connected to each of said members, a pivoted actuator means, spring means for urging said actuator in one direction, means for moving said actuator in a direction opposed to said spring means, releasable stop means for restraining said actuator in energized position, a one-way acting latch carried by said actuator operative on said lever during movement of said actuator by said spring means first to rock said lever temporarily to an open shutter position and then release it, and a time delay mechanism to restrain said latter movement of said actuator thereby to predetermine the interval said shutters remain open.

3. In a binocular camera, a pair of spaced shutters each normally urged by elastic means to a closed position, a pivoted lever connected to both said shutters to open them simultaneously, actuator means movable back and forth in a predetermined path, spring means for urging said actuator in one direction, manual means for shifting said actuator means to a cocked position against the force of said spring, releasable stop means for restraining said actuator in cocked position, and an intermediate selectively operable means carried by said actuator and positioned to contact said lever, said intermediate selectively operable means being pivoted on said actuator means so that it is automatically displaceable to ineffective position upon movement of said actuator to the cocked position and positively effective upon reverse movement of said actuator to rock said lever to open said shutters and then to release said lever to permit the shutters to close.

4. In a camera shutter mechanism, a shutter including spring means for normally urging it to closed position and an operating element to open it, a movable actuator means for said operating element, spring means for urging said actuator means in one direction, means for moving said actuator means in the opposite direction against the force of said spring means to a cocked position, means including a pair of spaced latch elements for restraining said actuator in cocked position against the action of said spring, said actuator means having a catch positioned thereon to advance between said latch elements upon movement of the actuator means in said opposite direction and to be engaged by a first one of said latch elements and upon release therefrom to advance under the pressure of said last-mentioned spring means into engagement with said second latch element, and a selectively operable detent pivotally carried by said actuator automatically displaceable to ineffective position upon movement of said actuator means to said cocked position but positively effective upon said opposite movement to engage and operate said shutter opening element.

5. In a stereoscopic camera, a pair of spaced shutters normally urged to closed position and each having an oscillatable operating member, a lever pivoted intermediate its ends between said shutters and connected to each of said members, a pivoted actuator means, spring means for urging said actuator in one direction, releasable stop means for restraining said actuator in energized position, a one-way acting latch carried by said actuator and operative on said lever during movement of said actuator by said spring means first to rock said lever to a position wherein it opens said pair of shutters and then to release it, and a time delay mechanism capable of restraining the movement of said actuator for a predetermined time to prevent the release of said lever by said latch and thus cause said pair of shutters to remain open a predetermined time interval.

ALBERT J. BACHELDER.
OTTO E. WOLFF.

REFERENCES CITED

The following references are of record in the file of this patent:

UNITED STATES PATENTS

| Number | Name | Date |
| --- | --- | --- |
| 366,947 | Fox | July 19, 1887 |
| 372,857 | Lewis | Nov. 8, 1887 |
| 2,331,569 | Pirwitz | Oct. 12, 1943 |
| 2,333,820 | Riddell | Nov. 9, 1943 |
| 2,385,804 | Fitz | Oct. 2, 1945 |

FOREIGN PATENTS

| Number | Country | Date |
| --- | --- | --- |
| 524,235 | Great Britain | Aug. 5, 1940 |